UNITED STATES PATENT OFFICE.

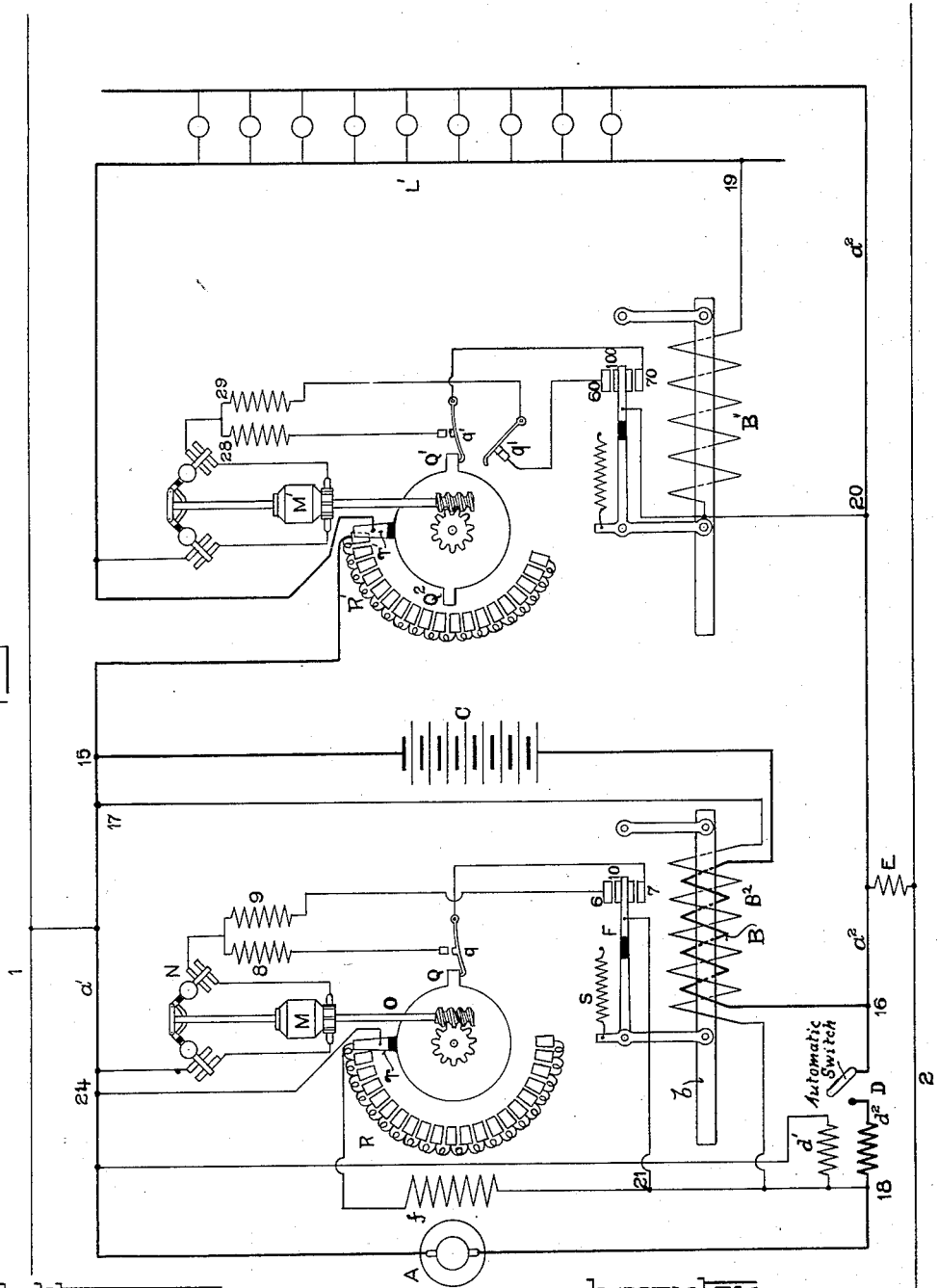

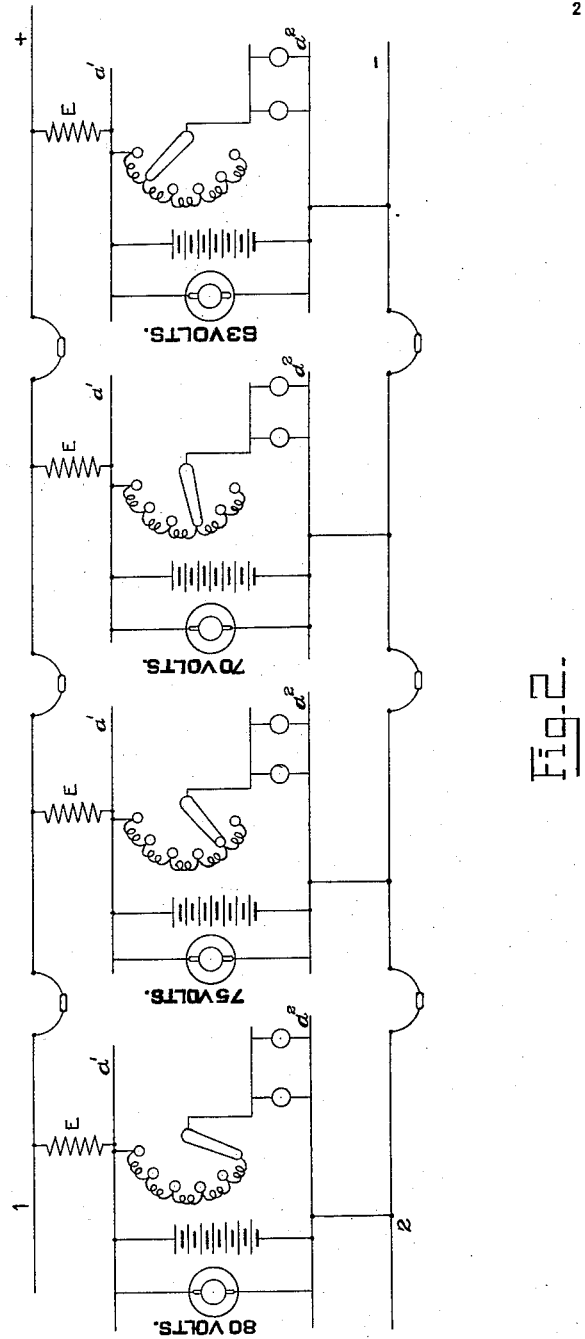

JAMES F. McELROY, OF ALBANY, NEW YORK, ASSIGNOR, BY MESNE ASSIGNMENTS, TO CENTRAL TRUST COMPANY OF NEW YORK, A CORPORATION OF NEW YORK, TRUSTEE.

ELECTRIC TRAIN-LIGHTING SYSTEM.

1,145,328. Specification of Letters Patent. Patented July 6, 1915.

Application filed December 15, 1905, Serial No. 291,824. Renewed November 16, 1914. Serial No. 872,499.

*To all whom it may concern:*

Be it known that I, JAMES F. MCELROY, a citizen of the United States, residing at Albany, in the county of Albany and State of New York, have invented certain new and useful Improvements in Electric Train-Lighting Systems, of which the following specification and accompanying drawings illustrate the invention in a form which I now regard as the best out of the various forms in which it may be embodied.

This invention relates to the electric lighting of trains by axle-driven generators and involves, in the first place, an arrangement whereby from a single dynamo there may be derived a widely variable potential for the storage-battery and an unchangeable potential for the lamps. In the second place, it involves an arrangement for lighting trains, as distinguished from separate and independent cars.

As regards the first part of the invention, I would say that I have heretofore employed a system in which a certain dynamo potential has been applied to the lamps and storage battery in multiple, being applied to the latter directly and to the former indirectly through a potential-reducing resistance. The potential thus applied to both lamps and battery has been substantially a constant potential, but modified from time to time during such periods as the battery is being charged to meet the changeable requirements of the battery, such modification being within the limits of permissible potential variation at the lamps, which, it will be noted, received the same potential as the battery minus that subtracted by the lamp resistance. This modification of potential was provided for by means of a modifier-coil in series with the storage battery and arranged to supplement, and so modify, the effect of the potential coil, which constantly measures the dynamo potential and, in the event of any increase or decrease thereof above or below the given standard, sets in action potential adjusting agencies which will correct the increasing or decreasing tendency and maintain the potential at the aforesaid standard. The effect of the modifier coil is to change, according to the value of the current flowing through the coil into the battery, the standard potential which the apparatus tends to maintain during the charging operation. Such a system is an effective one, but in some cases, I find it not sufficiently flexible to meet extreme requirements, and therefore I have devised the present arrangement, wherein the modified potential is applied to the storage battery only, this being secured by changing the point at which the potential-coil will come into action, and interposing in the lamp circuit an automatically adjustable resistance which will cancel out the modifying effect of the said modifier coil, so far as concerns the lamps. This makes the lamps independent of the potential-changes imposed on the storage battery to suit the storage battery conditions at different stages of the battery-charging operation; and, conversely, it makes the said potential changes independent of the lamps. I am therefore enabled to utilize a wider range of potential-variations in charging the battery such as would not be available if the lamps were exposed to the same range of changes. Moreover, in my previous system aforesaid I arranged to close the main switch, which connects the dynamo to the circuit, when the dynamo speed is sufficient to give the dynamo a potential substantially equal to the lamp-potential, and I thereafter caused the regulator to maintain a higher potential suitable for charging the battery by automatically increasing the tension on the retracting spring of the regulator magnet, which also controlled the said main switch. In my present arrangement I give the retracting spring of the regulator magnet a permanent adjustment, and, in opposition to the spring, I so construct the magnet that it will exert a substantially constant pull against the spring during the entire range of potential-variation. In connection therewith I provide a separate magnet for operating the said main switch, this magnet being energized by shunt and series windings according to a well known principle, and set to act at a potential not higher than the lowest battery-charging potential.

As regards the second part of my invention, to-wit, lighting of a train, as distinguished from individual cars, the arrangement just referred to is particularly fitted for this purpose. In addition, I provide devices, usable with the aforesaid car arrangement, or with any other suitable substitute therefor, which aim to meet the practical conditions found in the train situation. I provide each car of the train with an individual apparatus, such for instance as I have referred to above, but each dynamo is made of a capacity adequate to supply the needs of one or more cars in addition to those of its own car. All the dynamos of the train are then connected in multiple to train-wires extending through the train and serving as feeders to transmit the surplus energy from one or more dynamos of the train to other cars where a deficiency exists. By this means a train can be made up of cars having their batteries in different stages of exhaustion and their respective machines a little differently adjusted, or in a more or less perfect working condition and, by the arrangement just mentioned, the deficiencies of certain cars will be made up by the surplus from other cars. Moreover I provide between each dynamo and the receiving apparatus on any foreign car a certain resistance which will tend to limit the amount of current it will deliver to the foreign car as compared with that delivered to its own car, so that only the surplus which can be spared by its own lamps will be sent to assist the other cars. Preferably this resistance is inserted between the battery mains of each car and the train-line and the train-line is made of very low resistance, so that the surplus can be delivered to any car of a long train that may require assistance.

In the accompanying drawings—Figure 1 illustrates diagrammatically the preferred circuit arrangement for a single car. Fig. 2 illustrates a series of car circuits showing the relation of the different cars of the train to each other.

Referring to the diagrams of the drawings, A represents an axle-driven dynamo connected to the car-mains $a'$ and $a^2$, which are in turn connected to the respective train lines 1 and 2 with an intervening resistance E. The main switch is indicated at D and the usual shunt and series coils $d'$ and $d^2$ for operating it. From the car-main $a'$, one branch of the current flows from the point 15 through the storage battery C, and thence through the modifier coil B (to be described later) to the main $a^2$ at the point 16. The other branch of the current flows from the point 15 through the lamp-resistance R', and thence from the contact $r'$ of the resistance to the lamps L' and to the main $a^2$.

To maintain independent potentials at the battery and the lamps, the battery-potential changing according to the battery conditions and the lamp-potential remaining constant, I employ two shunt or potential magnets, one for the battery, and the other for the lamps. The former magnet is supplemented by the aforesaid modifying coil in series with the battery, and the latter acts alone without such modifier. Each of these magnets I use to control a motor which operates a regulating resistance, the regulating resistance controlled by the battery-magnet being contained in the field-magnet circuit of the dynamo A, and that controlled by the lamp magnet being contained in the lamp circuit in series with the lamps.

$B^2$ is the battery magnet, its shunt coil being connected to the main $a'$ at the point 17 and to the main $a^2$ at the point 18.

B' is the lamp magnet connected on one side to $a'$ at the point 19 and on the other side to $a^2$ at the point 20.

The shunt coil of the battery-magnet is supplemented by the modifying coil B above referred to in series with the battery. If the battery is exhausted and its counter pressure thereby reduced, a large current will tend to flow into it and through the modifying coil. This will give the battery magnet an initial strength, so that its total strength (*i. e.* the strength required to hold its core in the neutral position against the force of its retracting spring S) may be secured by a lesser current in the shunt coil (corresponding to a lesser potential on the car-mains) than would be the case, if this initial strength were less or absent altogether, which would be the case if the storage battery were nearly or wholly charged and its counter pressure nearly or fully equal to the charging pressure.

M is the motor controlled by the battery magnet B, and it has two distinct field magnet coils 8 and 9 which are oppositely wound, so that the motor will rotate in one direction when current is admitted to it through field-magnet coil 8, and in the other direction when current is admitted to it through field-magnet coil 9. The motor is in a shunt circuit between mains $a'$ and $a^2$. Starting from main $a^2$, at the point 18, this circuit goes to the point 21 and thence to a contact 10 on the tip of angle lever F, operated by magnet $B^2$. When contact 10 touches a contact 6, just above it (when magnet $B^2$ becomes too strongly energized and draws in its core $b$) then the motor circuit will be closed through field-magnet coil 9. When, on the contrary, contact 10 touches the lower contact 7, the motor circuit will be closed through its field-magnet coil 8. Normally—that is when the battery voltage is satisfactory to the magnet $B^2$—its core $b$ will hold the contact 10 out of engagement with both of the contacts 6 and 7 and it is this satisfied condition of the magnet $B^2$ which is produced by a greater or less voltage of the main dynamo according to the less or greater current in the battery-branch coil of the magnet, and the less or greater value of the initial power imparted to the magnet thereby. Therefore when the battery is exhausted and a large current tends to flow into it, the magnet $B^2$ will be satisfied by, and maintain a lower dynamo voltage; and, on the other hand, when the battery is fully charged and little or no current tends to flow into it, a higher dynamo voltage will be required and maintained to keep magnet B² in satisfied condition. Any departure from this satisfied condition caused by an increase or decrease of dynamo voltage, such for instance as would result from speed changes of the train, will bring contact 10 into engagement with either contact 6 or contact 7 and thereby set the motor to work to change the amount of resistance R in the field-magnet circuit of the dynamo, and thereby correct the departure by increasing or decreasing the power and voltage of the dynamo, until the magnet B² is again satisfied and stops the motor by breaking its circuit at the contact 10. When the train stops, the effort of the apparatus to maintain the falling voltage will bring the resistance contact $r$, of resistance R, into the position shown in Fig. 1, with all of the resistance removed from the field magnet circuit. That circuit is a shunt across from main $a'$ to main $a^2$, starting at the point 24 and going thence to contact $r$, and through more or less or none of the resistance R, to the dynamo field magnet $f$, whence it goes to main $a^2$ at the point 18. As the apparatus arrives at this "off" position of Fig. 1 a projection Q, on the rotating part which is driven by the motor M through screw shaft O, strikes and opens a circuit breaker $q$ in the motor circuit through field coil 8 (which has been operating to bring the parts to this "off" position) and so leaves that circuit open so long as the train is at rest and prevents a waste of battery current which would result if the circuit were left closed during that period. When the train starts again, it is necessarily the other motor circuit through field magnet 9 which first comes into action (to check the rise of dynamo voltage) and when this occurs it moves stop Q away from circuit-breaker $q$ and allows it to close. The motor M has a governor N, which acts to prevent racing of the apparatus by breaking the motor circuit, if its speed becomes too great.

The purpose of the apparatus thus far described is to maintain the dynamo voltage at a point which is determined solely by the battery requirement, and since this involves, in certain situations, a dynamo-voltage having a range of variation greater than is desirable at the lamps, I have provided the resistance R' which will be automatically varied in amount in accordance with the potential-variations on the battery. The resistance R' is operated, like resistance R, by means of a motor, M' which, like the motor M, has two oppositely wound field magnets 28 and 29, whose circuits are controlled by a contact 100, operated by the core of magnet B' and playing between upper and lower contacts 60 and 70 which form the respective terminals of the field magnets 28 and 29. The circuit of field magnet 28 is provided with a circuit-breaker $q'$ operated by a projection Q' corresponding to and for the same purpose as the circuit-breaker $q$ operated by the projection Q. This projection Q' moves the contact member $q'$ to open the circuit of the field winding 28 when the arm $r'$ has returned to initial position to cut out all the resistance from the lamp circuit. When the regulator operates to insert resistance in the lamp circuit, the field winding 29 is energized and operates the motor in a direction to cut in resistance, thereby closing the circuit to the field winding 28. When all the available resistance R' has been cut into the lamp circuit, the projection Q² has moved around and operates the other contact member $q'$, thereby stopping the motor. The maximum resistance remains in the lamp circuit until the conditions warrant a reduction in said resistance, whereupon the other field winding 28 becomes energized and reverses the motor, thereby closing the circuit to the field winding 29. The magnet B' shunting the lamps L' will measure the potential applied to the lamps, and, as that potential tends to increase or decrease by reason of an increase or decrease in the potential applied to the battery, it will close the circuit of motor M' and cause it to rotate in one direction or the other to introduce a larger portion of the resistance R' in series with the lamps L' when there is a tendency to potential increase and, conversely, introduce a smaller portion thereof in series with the lamps when there is a tendency to a potential decrease. By this means the potential of the lamps L' will be maintained constant in spite of wide variation in the potential applied to the battery. The motor M' is also provided with a centrifugal governor corresponding to the governor N of the motor M.

In Fig. 2 I have indicated diagrammatically a series of car-circuits, like that included in Fig. 1, applied to the respective cars of a four-car train. Between the trainlines 1 and 2 and each of the respective car circuits is interposed a resistance E. It will be understood that the dynamo of each train has a capacity to supply more current than is required by the demands of its own car. For illustration it may be assumed that on the first car, beginning at the left, the battery conditions are, at some given time, such as to require a dynamo potential of 80 volts, while on the three remaining cars the dynamo voltage is respectively 75, 70 and 63 volts and, moreover, that the 80 volt car is capable of supplying current for its own needs and sparing 25 amperes for the needs of other cars. Then it follows by simple calculations that if each of the resistances E is 8/25 of an ohm, there will be on the train-line a potential of 72 volts at all points, and, while the first car delivers to the train-line a current of 25 amperes and the second car a current of 9-3/8 amperes, there will flow from the train-line to the third car a current of 6-1/4 amperes, and to the fourth car a current of 28-1/8 amperes. This represents a practical but extreme condition, the maximum and minimum voltages being in ordinary cases within narrower limit. In all cases, however, it is desirable to employ the resistance E, which will be of a value dependent upon the capacity of the several dynamos and the approximately mean voltage to be maintained on the train-line. The resistances E will act to protect the supply of any individual car by limiting the amount of surplus current which it can deliver to the others, and at the same time it will protect the regulator on each car in its duty of giving to its own battery the appropriate potential as may be determined by its individual regulator, instead of an unduly high pressure such as might be otherwise received from a car whose battery is completely charged and whose voltage therefor is at a maximum, or at least higher value.

What I claim as new and desire to secure by Letters Patent is:

1. In a train lighting system, the combination of local conductors $a^1$ $a^2$ on each car, lamps and a storage-battery on each car connected to the said local conductors in multiple, a dynamo on each car also connected with these conductors, means for adjusting the voltage of each dynamo according to the conditions of the local battery on the same car, and a voltage-reducing train line connecting the dynamo and battery terminals on one car of the dynamo and battery terminals on one or more adjacent cars.

2. The combination with a railway car, of an axle-driven dynamo having a capacity greater than is required by the car, a train-line, a resistance between said train-line and the dynamo, a local circuit connected to the dynamo between the dynamo and said resistance and lamps connected to said local circuit through a resistance.

In testimony whereof I have hereunto set my hand in the presence of two subscribing witnesses, the 13th day of December, 1905.

JAMES F. McELROY.

Witnesses:
BEULAH CARLE,
ERNEST D. JANSEN.